United States Patent
Crowson, II (10) Patent No.: US 9,762,105 B2
(45) Date of Patent: Sep. 12, 2017

(54) HINGED MOTION TRANSDUCER

(71) Applicant: Randolph J. Crowson, II, Santa Barabara, CA (US)

(72) Inventor: Randolph J. Crowson, II, Santa Barabara, CA (US)

( * ) Notice: Subject to any disclaimer, the term of this patent is extended or adjusted under 35 U.S.C. 154(b) by 569 days.

(21) Appl. No.: 14/216,673

(22) Filed: Mar. 17, 2014

(65) Prior Publication Data

US 2014/0265648 A1    Sep. 18, 2014

Related U.S. Application Data

(60) Provisional application No. 61/794,318, filed on Mar. 15, 2013.

(51) Int. Cl.

| | |
|---|---|
| *H02K 41/00* | (2006.01) |
| *B60N 2/50* | (2006.01) |
| *H02K 7/14* | (2006.01) |
| *H02K 41/03* | (2006.01) |
| *H02K 41/035* | (2006.01) |

(52) U.S. Cl.
CPC ............ *H02K 7/14* (2013.01); *H02K 41/031* (2013.01); *H02K 41/0356* (2013.01)

(58) Field of Classification Search
CPC .... H02K 7/14; H02K 41/031; H02K 41/0356; H02K 33/00; G01M 7/04; H04R 9/066; H04R 5/023; G09B 9/14; A47C 7/72
USPC ................. 310/15, 17, 20, 36–38, 12.16, 81
See application file for complete search history.

(56) References Cited

U.S. PATENT DOCUMENTS

| | | | |
|---|---|---|---|
| 3,865,430 A | 2/1975 | Tanus | |
| 3,923,300 A | 12/1975 | Tanus | |
| 4,321,044 A * | 3/1982 | Kron ................. | G09B 9/10 |
| | | | 297/284.9 |
| 5,022,708 A | 6/1991 | Nordella et al. | |
| 5,490,713 A | 2/1996 | Fukuoka | |
| 5,556,161 A | 9/1996 | Fukuoka | |
| 5,678,889 A | 10/1997 | Purcell, Jr. | |
| 6,056,357 A * | 5/2000 | Fukuoka ............ | B60N 2/502 |
| | | | 297/217.3 |
| 6,056,362 A | 5/2000 | de la Haye | |
| 6,256,397 B1 * | 7/2001 | Komatsu ............ | H04R 9/066 |
| | | | 381/333 |
| 6,662,560 B2 | 12/2003 | Roy et al. | |
| 7,069,787 B2 * | 7/2006 | Crowson, II ....... | G01M 7/04 |
| | | | 297/217.3 |
| 7,866,747 B2 | 1/2011 | Park | |
| 7,934,773 B2 | 5/2011 | Boulais et al. | |
| 2008/0009776 A1 | 1/2008 | Trandafir | |
| 2009/0154737 A1* | 6/2009 | Ostler ................. | A47C 7/72 |
| | | | 381/301 |

FOREIGN PATENT DOCUMENTS

JP          60032066 A  *  2/1985

* cited by examiner

*Primary Examiner* — Tran Nguyen (57) ABSTRACT

A hinged electrodynamic transducer apparatus is disclosed for providing oscillating and/or vibrational motion. The hinged transducer of the present invention is configured to be robust and low profile for installation under chairs, seats, and other items of furniture such that it can impart vibrational motion capable of being sensed by the human body (DC to approximately 500 Hz).

20 Claims, 11 Drawing Sheets

HINGED MOTION TRANSDUCER

RELATED APPLICATION INFORMATION

This application claims the benefit of and is a utility application of U.S. provision patent application Ser. No. 61/794,318, which is entitled HINGED MOTION TRANSDUCER.

BACKGROUND OF THE INVENTION

1. Field of the Invention

This invention relates generally to an apparatus for converting electrical signals into physical motion through the use of an electromagnetic transducer. In particular, the present invention provides a robust, low profile motion system having one or more hinged elements which may be easily placed under an object or series of objects in order to impart vibrational motion in response to electrical or motion based signals from a wired or wireless signal source.

2. Description of Related Art

The field of electrodynamic transducers for imparting shaking, push/pull, or other vibrational type motion is well established. In particular, the field of inducing motion in seating systems such that a person seated in the chair experiences vibrational sensations indicative of low frequency (ie. bass) sound includes various types of systems and configurations to accommodate different frequency oscillations. For extremely low frequencies (eg. DC to 20 Hz oscillations) various hydraulic systems, rotary motors with encoders, worm drive systems and sensors for control and position verification (closed-loop) have been used in prior art systems. The applicant for the present invention considered these prior motion systems and found many deficiencies for the applications described in the present invention. Generally, existing seating transducer systems are expensive, complicated to both install and use, and prone to mechanical and other system failures. Generally the complexity and size of these prior art systems require that the mechanical and motion apparatus be integrated in/with the seat in such a way that the seat and motion transducer system must be designed together and produced as one integrated product, and multiple seats in a theater type installation may not share arms or be connected to the adjacent seats, thereby reducing the number of seats that can fit in a room. The backlash in worm drive and hysteresis in the electrical and drive systems also typically limits the operation to around 100 Hz, and since the human body can sense vibration up to approximately 500 Hz, in these systems the range from 100 Hz to 500 Hz cannot be felt by a user.

Current art for creating vibration motion in higher frequencies capable of being sensed by the human body (eg. 20 to 500 Hz) in theater seats typically cannot adequately perform below 20 Hz because they employ inertial shaking systems using a moving mass-spring system to vibrate a portion of the seat. Typically these systems are only capable of vibrating the back or cushion area of a seat, and are not capable of moving the whole seat in unison for a realistic motion sensation.

Thus, a system and device is needed such that it 1) can be used in conjunction with currently installed theater seats as a retrofit upgrade, 2) performs well throughout the range of motion capable of being perceived by the human body (DC to approximately 500 Hz), 3) responds to a combination of frequencies as opposed to singular frequency oscillations, 4) moves the entire seat in one (up and down), two (tilt, up and down), or three (rock, tilt, up and down) axes, with a simple open-loop analog signal power source and low system cost and complexity.

SUMMARY OF THE INVENTION

The current invention encompasses a hinged motion transducer which can impart motion to an object (a chair, seat(s), or other similar apparatus in the primary embodiment) in connection with signals from an audio visual presentation system, motion control signal system, or other electronic apparatus capable of driving an actuator (electrodynamic in one embodiment) incorporated with the motion transducer. The current invention is capable of imparting motion through the range or frequencies capable of being sensed by the human body (approximately DC through 500 Hz) as well as accommodating a combination of frequencies simultaneously (such as those frequencies associated with audiovisual presentations).

The motion transducer may be used alone to cause vibrations in an object placed on it, or incorporated with other objects such as chairs, in order to impart motion sensations to a person sitting in the chair corresponding to an audiovisual presentation. In one embodiment multiple motion transducers may be used in connection with multiple chairs in order to impart motion to many people at once, such as in a movie theater or similar entertainment venue, the motion corresponding to audiovisual or motion based signals. As will be appreciated from the detailed description below, the present invention can be used with a wide range of existing seats and chairs, and can function with seats that have as little as one supporting foot and a wide range of foot bolt patterns. The present invention can easily be used for retrofit theater installations by bolting down to threaded holes in the floor previously used for directly attaching the seats, and can also withstand large external forces on the seat in all directions allowing minimal seat deflection and movement both after installation and during motion operation.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENT

The present description is of the best presently contemplated mode of carrying out the invention. This description is made for the purpose of illustrating the general principles of the invention and should not be taken in a limiting sense.

All publications referenced herein are fully incorporated by reference as if fully set forth herein.

The present invention can find utility in a variety of implementations without departing from the scope and spirit of the invention, as will be apparent from an understanding of the principles that underlie the invention. For instance, the present invention is best described as used in conjunction with theater seating and other items of furniture, entertainment systems (including home audio/video equipment, theater or other large public venue equipment, demonstration, laboratory, simulation, or game systems, etc) such that the transducer can vibrate the furnishings in response to electrical signals from the entertainment system, however it may find utility when used with a plethora of systems or devices which are to be moved, oscillated or vibrated, such as laboratory test subjects, dance floors, home theater seating, bed frames, platforms etc.

Figure 1:
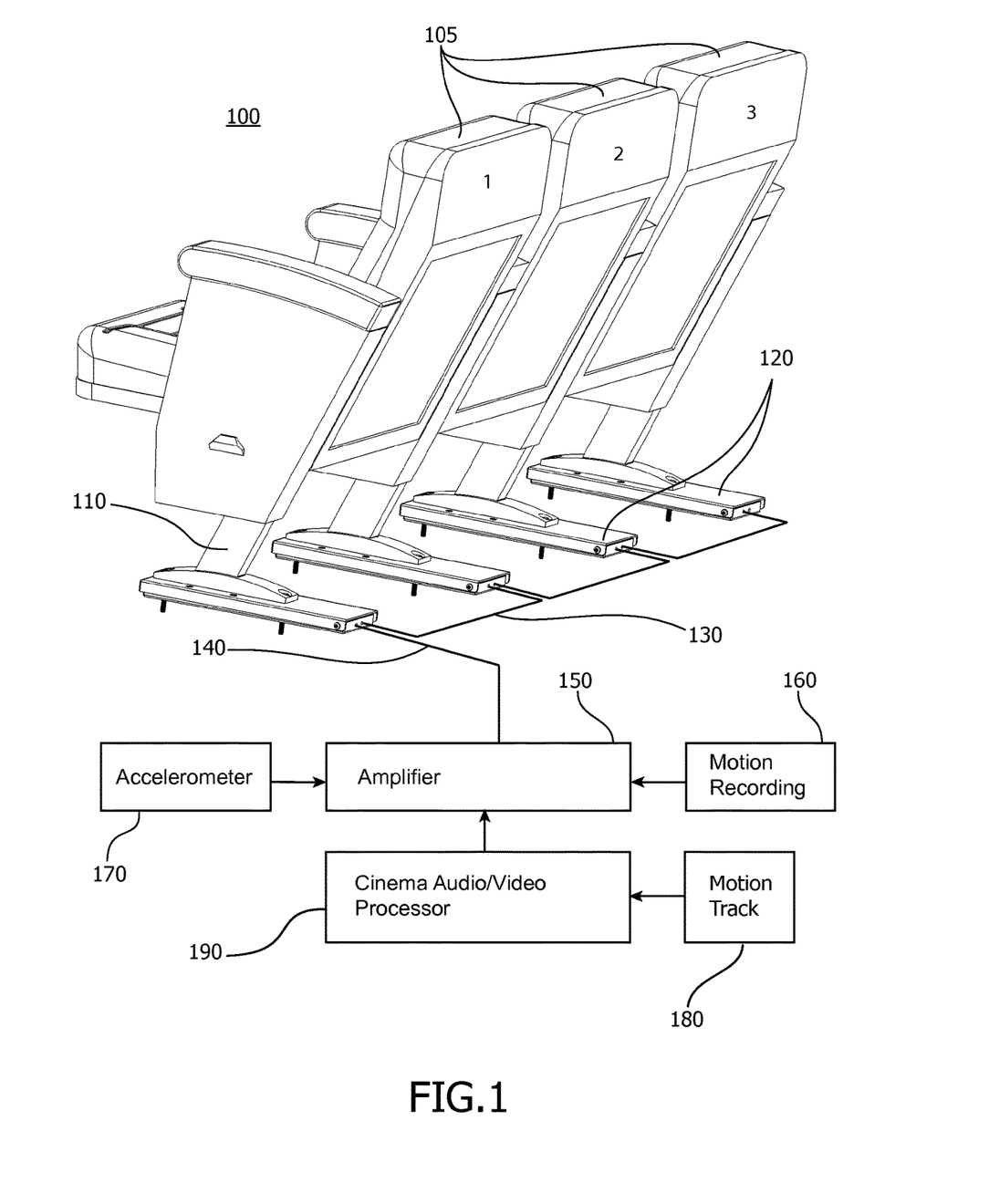
FIG. 1 is a view showing a theater seating system using multiple hinged motion transducer elements according to the present invention.
Figure 2:
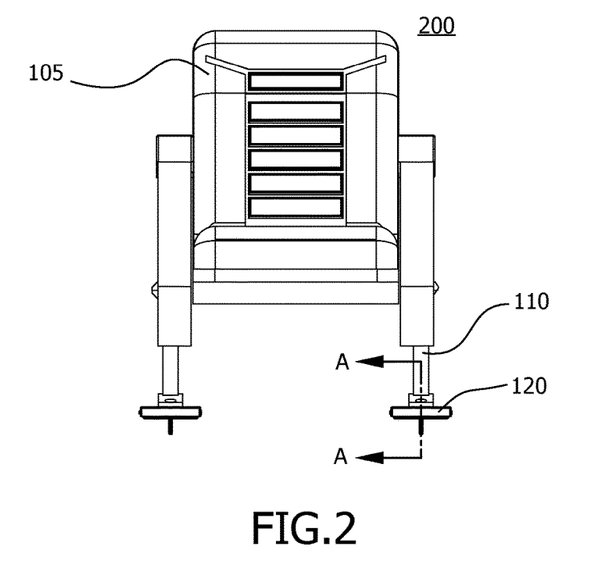
FIG. 2 is a front view of a single theater seat coupled with two hinged motion transducers.
Figure 3:
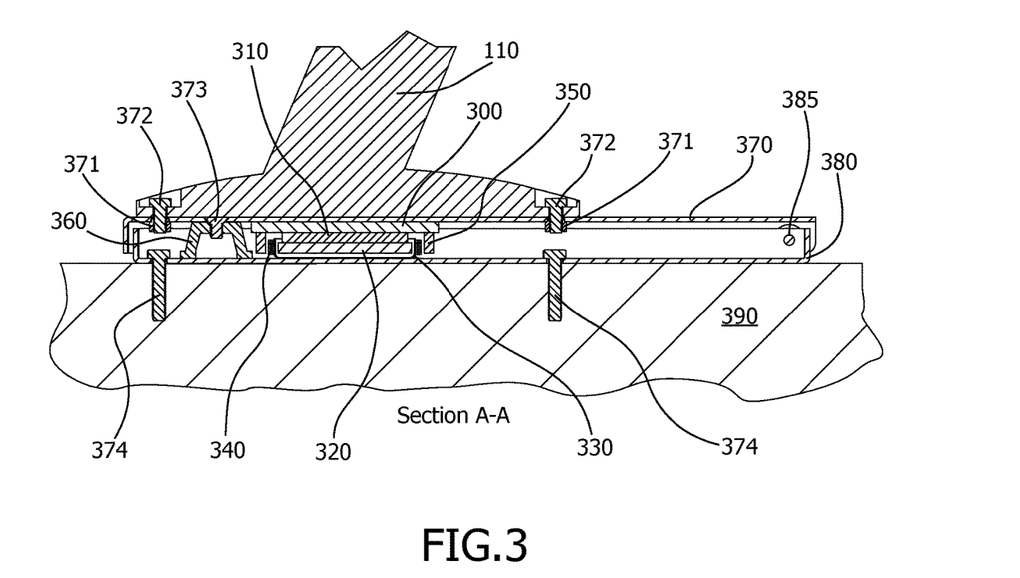
FIG. 3 is a side cutaway view of the preferred embodiment of the present invention.
Figure 4:
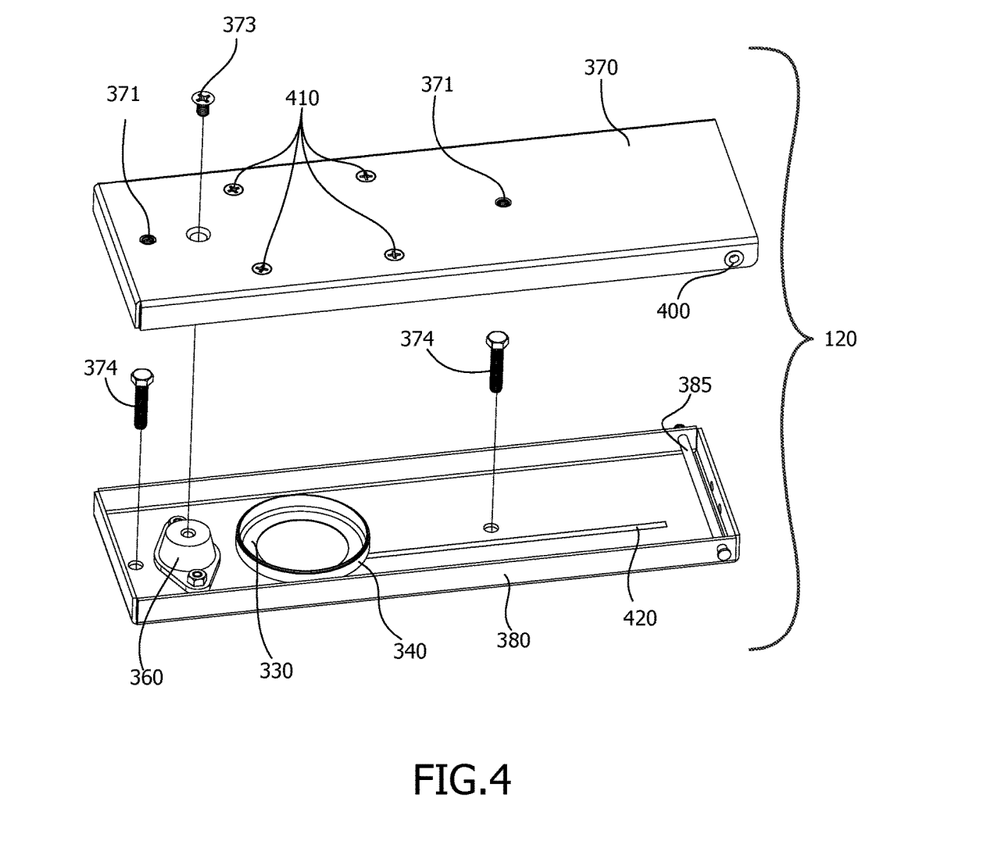
FIG. 4 is an exploded view of the preferred embodiment of the hinged motion transducer of the present invention.
Figure 15:
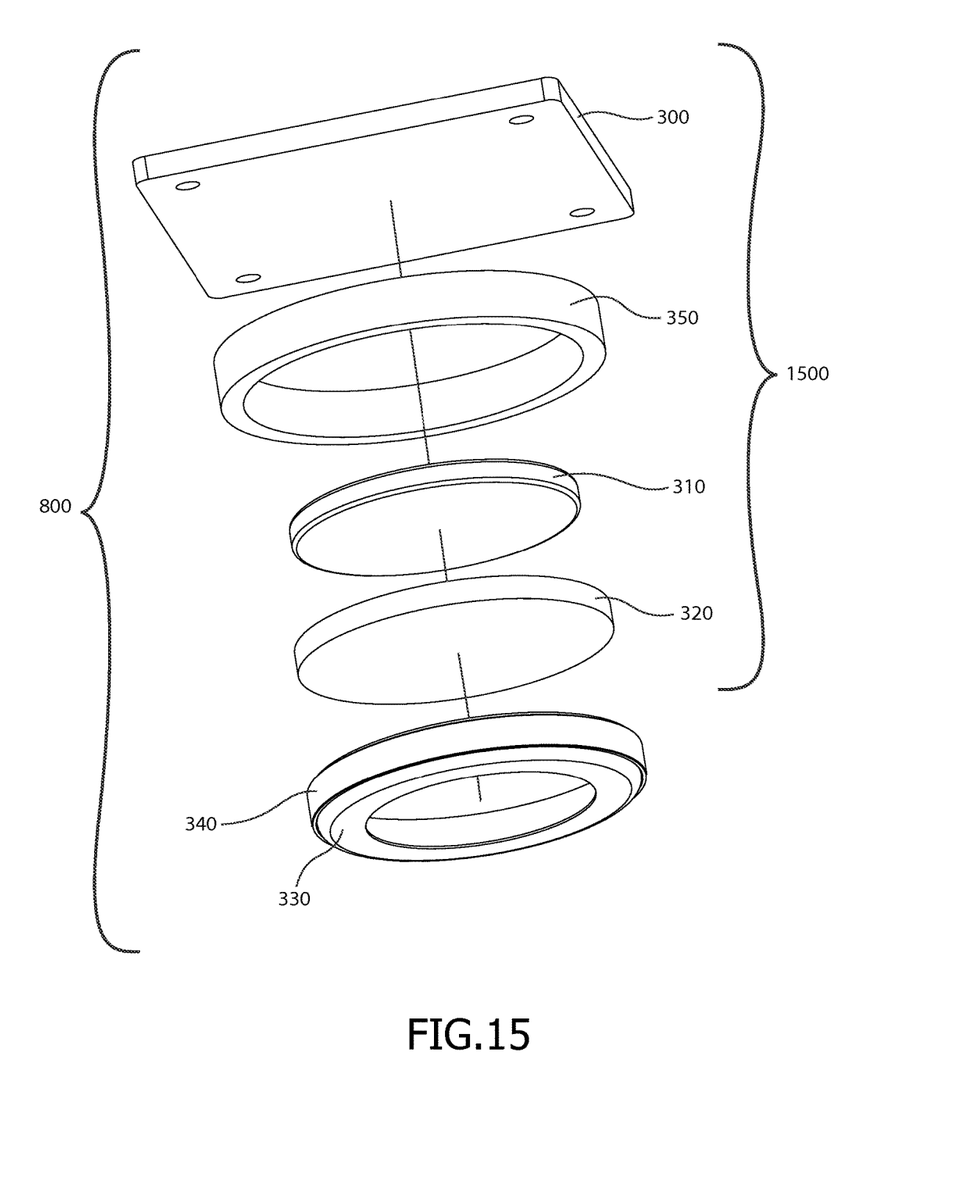
FIG. 15 is an exploded view of one embodiment of the electromagnetic assembly of the present invention.

Looking now to FIGS. 1 and 2, example transducer apparatus 120 is shown schematically in a theater seating system 100 in FIG. 1, and in a front view of a single motion seat 200 in FIG. 2, to illustrate the current invention. Transducer 120 is located beneath one or more seat legs 110 of theater seating system 100 or single motion seat 200 in order to impart vibrational motion to a person or other subject in theater seat(s) 105. Seating system 100 in FIG. 1 illustrates multiple transducer units 120 mounted under multiple connected theater seats 105 in order to impart vibrational motion during an audio-visual presentation (eg. movie, concert, theater production, etc). Transducer units 120 are electrically connected to each other via system connection wire 130, and at least one transducer unit is then electrically connected via wire 140 to amplifier 150 which provides the appropriate power necessary to drive electromagnetic assembly 800 in order to cause vibrational motion in theater seating 105. A motion signal recording 160 may be sent or used by the amplifier 150 to drive the transducer 120 with appropriate vertical acceleration relative to time. Signals from accelerometer 170, Motion recording 160 or Processor 190 to amplifier 150 can be analog, AES3 or any standard audio signal type. Signals may pass through audio mixing equipment prior to delivery to amplifier 150. In one embodiment of the present invention accelerometer 170 may be employed to provide additional or supplemental signal input to amplifier 150 in order to drive transducer 120. Accelerometer 170 may be any device or apparatus that measures acceleration or vibration from the surface of an object. In one embodiment accelerometer 170 may be attached to instruments during a live musical presentation (eg. guitar, bass, drums, stage floors, etc) in order to detect nuanced vibrational characteristics during a performance which may then be imparted to audience members in theaters seats 105 in accordance with the current invention. In another embodiment, the accelerometer 170 may be used to dampen motion in theater seating 105 or other object in contact with transducer 120 by utilizing "noise canceling" or similar processing algorithms in amplifier 150 in order to counteract vibrational motion detected by accelerometer 170. It may be advantageous to employ such noise cancelling/motion dampening technology in applications such as removing unwanted ground vibration from adjacent theater rooms, or removing yacht, plane, bus, or other vehicular vibrations from seats, beds, or other items of furniture in accordance with the current invention. In the preferred embodiment amplifier 150 is configured as a 100 Wrms/ motion transducer, DC to 500 Hz, combination of frequencies, flat frequency response amplifier, the motion recording 160 is linear Pulse Code Modulation (PCM), the cinema audio/video processor 190 is a Qube brand Digital Cinema Processor (such as those available from http://www.qube-cinema.com/), and the motion track 175 is linear PCM, however it will be understood and appreciated by those skilled in the art that a variety of different existing devices and systems can be used in connection with the present invention, including integrated systems that include one or more of the above elements in a single device, without departing from the spirit and scope of the present invention. For example, to maintain phase-accurate synchronization with the motion picture sound track, the motion track 180 signal can be carried within the main sound track file from cinema audio/video processor 190 alongside other main sound audio channels FIG. 3 shows a side cutaway view along axis A-A from FIG. 2, and FIG. 4 shows an exploded view, each of transducer 120 to illustrate the current invention. Generally, transducer 120 comprises rigid top plate 370 operatively coupled with bottom plate 380 via a hinge mechanism. In the present embodiment the hinge mechanism comprises hinge shaft 385 in bottom plate 380 inserted in hinge bushing 400 located in top plate 370. It will be appreciated that a variety of hinge mechanism elements could be used to allow for angular opening/closing motion in top plate 370 with respect to bottom plate 380 without departing from the spirit and scope of the present invention. In order to facilitate vibrational motion in transducer 120 an electromagnetic assembly 800 (shown in an exploded view in FIG. 15) is configured within top plate 370 and bottom plate 380. Generally electromagnetic assembly 800 comprises return pole 300, permanent magnet 310, main pole 320, coil bobbin 330, voice coil 340, and return ring 350. In the preferred embodiment, a coupled magnet assembly 1500 comprised of return pole 300, permanent magnet 310, main pole 320, and return ring 350 are fixably attached to top plate 370 via screws 410, while coil bobbin 330 and voice coil 340 are correspondingly integrated into bottom plate 380. Coil wire 420 connects the voice coil 340, and wire 140 to complete an electrical circuit with amplifier 150. Similar electromagnetic assemblies and other configurations of electromagnetic assembly 800 are described in greater detail in U.S. Pat. No. 8,061,210, which is incorporated by reference herein in its entirety. in the preferred embodiment of the present invention, bottom plate 380 of transducer 120 is fixably coupled to floor 390 via screws 374. Seat leg 110 is fixably attached to mounting nuts 371 in top plate 370 via screws 372. In the preferred embodiment mounting nuts 371 are press fit PEM nuts with an interior nylon locking feature, however it will be understood and appreciated that many different fastening systems may be used depending on the desired application without departing from the spirit and scope of the present invention. In order to provide resilient support to transducer 120 and support the load from theater seat 105, compression and tension spring 360 is configured between top plate 370 and bottom plate 380 and fixably held in place by screw 373. Multiple compression and tension springs may be employed. Compression and tension spring 360 may be made out of rubber, elastomeric material, metal coil, metal flexure, or other springlike material depending on the particular application.

Figure 5:
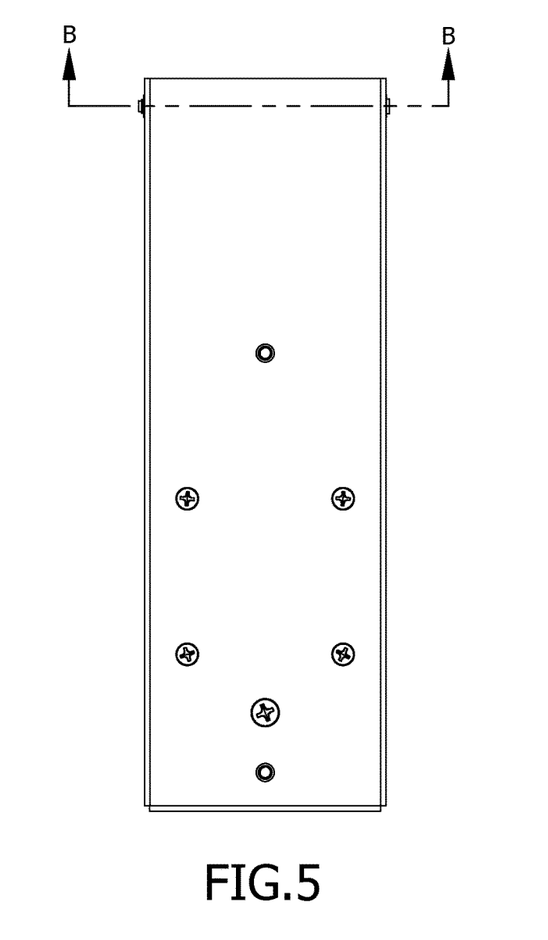
FIG. 5 is a top view of the preferred embodiment of the present invention shown in FIG. 4.
Figure 6:
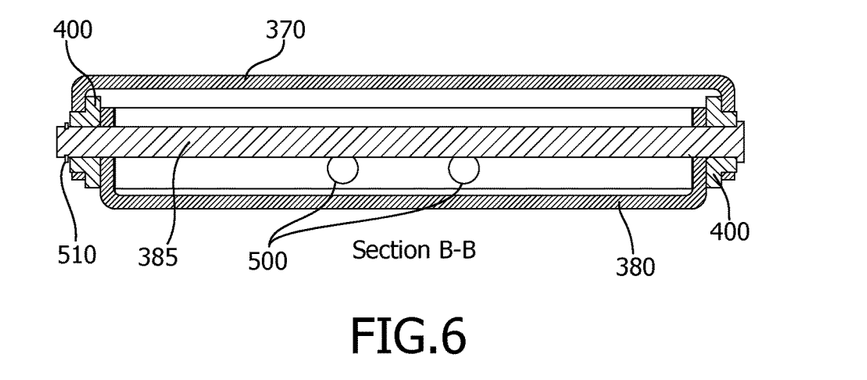
FIG. 6 is a rear cutaway of the preferred embodiment of the present invention shown in FIG. 4.

FIGS. 5 and 6 are top view and side cutaway view along the B-B axis of transducer 120 respectively, to illustrate the current invention. One or more holes 500 are provided for access by wire 140 to electrically connect with electromagnetic assembly 800. Additional wires for power or signal provision to transducer 120 may be implemented through holes 500 in order to connect with additional electronic componentry as will be described in greater detail below. A retaining clip 510 is illustrated in connection with hinge shaft 385 in order to hold hinge shaft 385 in place when it is inserted through hinge bushings 400.

Figure 7:
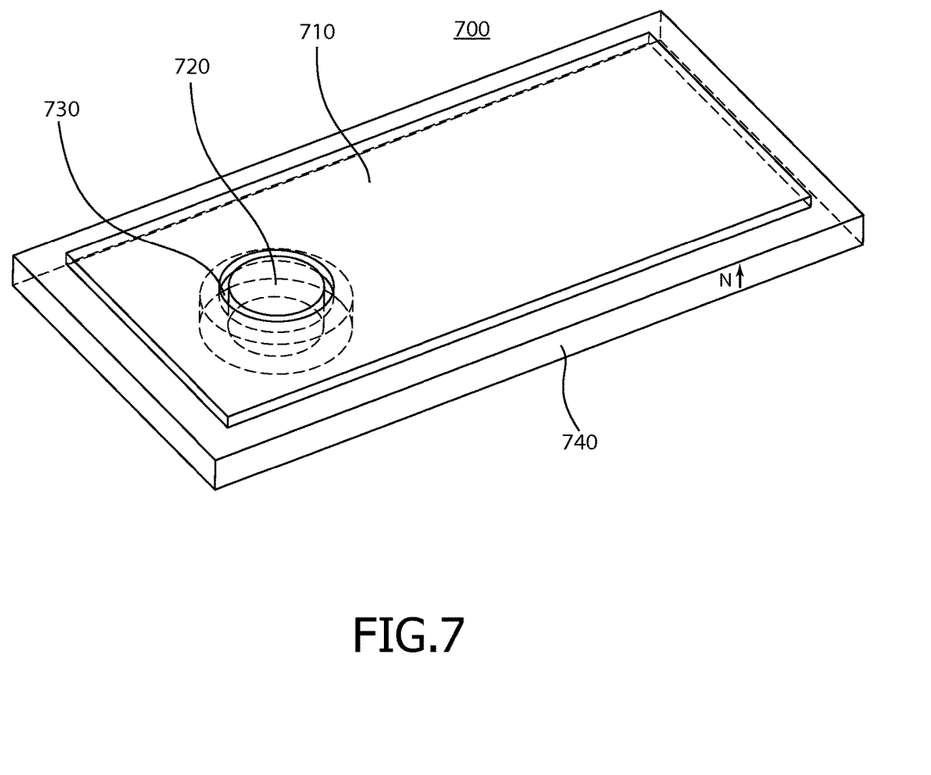
FIG. 7 is an isometric view of one embodiment of a long coupled magnet assembly.

Turning now to FIG. 7, an alternative long magnet assembly embodiment is illustrated. Coupled magnet assembly 700 is comprised of top pole 710, center return pole 720, and magnetic material 740. Magnetic gap area 730 is configured to receive voice coil 340 with substantially equidistant inner diameter (ID) and outer diameter (OD) gap distances. The coupled stator assembly 700 is ideally sized and arranged to increase the total volume of magnetic material 740 that will fit within the space between top plate 370 and bottom plate 380 and increase the magnetic field strength within gap 730. Coupled stator assembly 700 utilizes top plate 370 as a magnetic return pole. In this embodiment top plate 370 and center return pole 720 must be constructed from magnetic material. With this design it is possible to use inexpensive ceramic magnetic material as opposed to permanent magnets which are typically more expensive.

Figure 8:
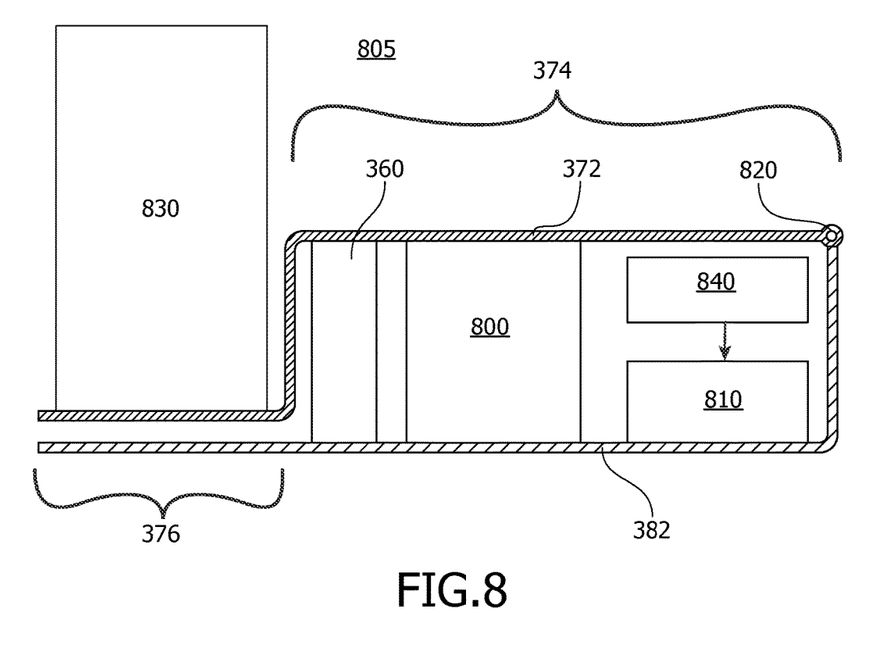
FIG. 8 is a side view of an embodiment of the present invention.

Turning now to FIG. 8, a side profile view of an alternative embodiment of the present transducer invention is illustrated. Transducer 805 includes bottom plate 382 operatively connected to top plate 372 via piano hinge 820. Top plate 372 in this embodiment is configured with a first plate portion 374 sized and shaped to accommodate electromagnetic assembly 800, spring element 360, and other transducer components, and a second plate portion 376 with a lower nominal height with respect to bottom plate 382 in order to support object 830 closer to the floor or other fixed surface on which transducer 805 is placed. Using this configuration object 830, such as a chair leg, or other portion of furniture can be as close to the floor as possible while still providing for the vibrational motion aspects in accordance with the current invention. The current embodiment also shows electrical amplifier 810 and wireless receiver 840 fully integrated within transducer 805 in order to allow for a compact, portable, and self contained motion vibration system. Electrical amplifier 810 according to the present embodiment is a Class-D, 100 Wrms, DC-500 Hz, combination of frequencies, flat frequency response amplifier, and wireless receiver 840 is a 2.4 gHz radio frequency (RF), DLNA device that can be activated and controlled by a (point of sale) POS system or smart device (ie. smartphone or tablet computer), both of which may be connected to an electrical source via a wire (not shown) or may be battery powered within transducer 805. The present embodiment shown in FIG. 8 may be implemented for applications such as an automatic baby crib vibrational system. In this embodiment one leg or portion of a baby crib may be supported as object 830, and transducer 805 may be used to impart vibrational motion to the crib in response to audio signals (ie. music) sent to wireless receiver 840 by a smart device (ie. smartphone or tablet computer), amplified by amplifier 810, and driven through electromagnetic assembly 800. Due to the extremely low profile design of transducer 805, it is possible that only one leg of a crib may be configured with transducer 805, without the need for other legs of the crib to be raised to level. It will be understood and appreciated by those skilled in the art that a variety of compact amplifier and wireless receiver elements may be implemented with the current invention depending on the particular size and application of the transducer device, without departing from the spirit and scope of the current invention.

Figure 9:
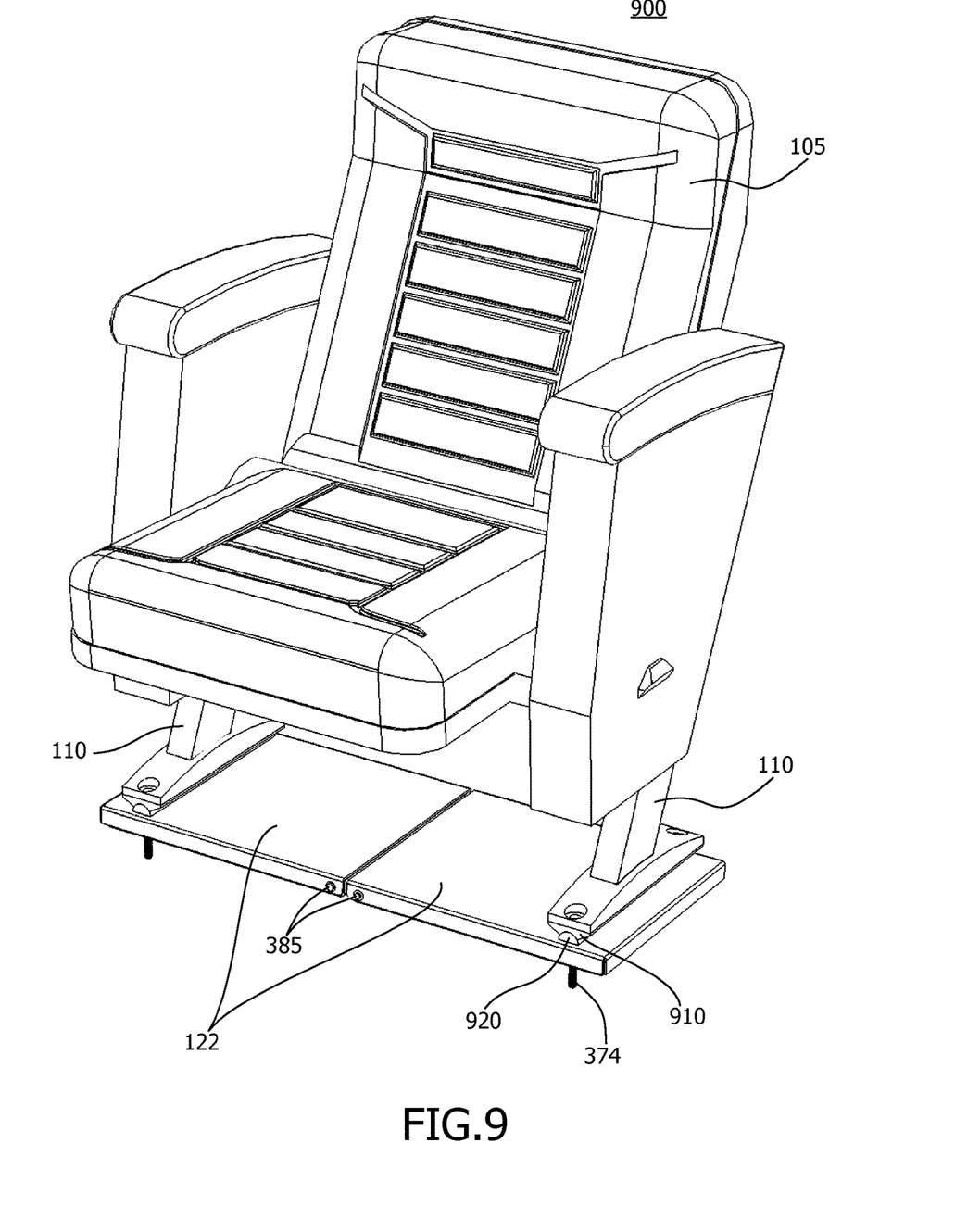
FIG. 9 is a view showing a dual axis embodiment of the present invention.
Figure 10:
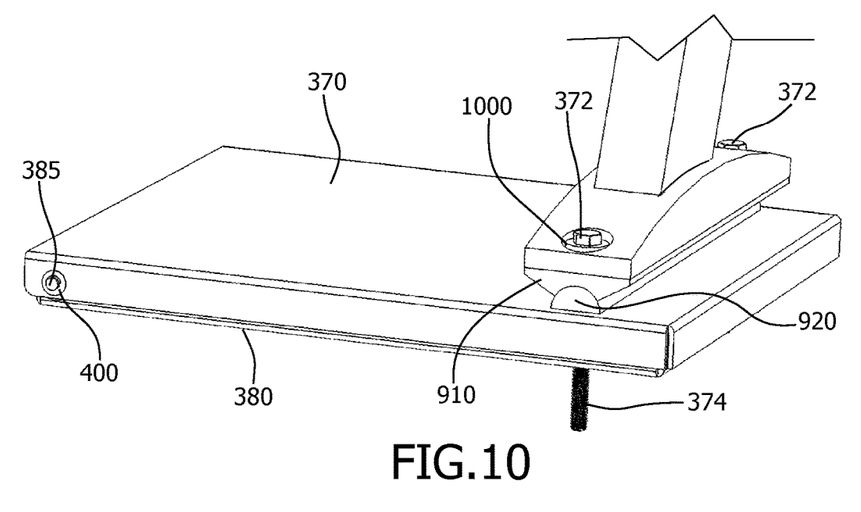
FIG. 10 is a view of one embodiment of a theater seat attachment system in a dual axis embodiment of the present invention.
Figure 11:
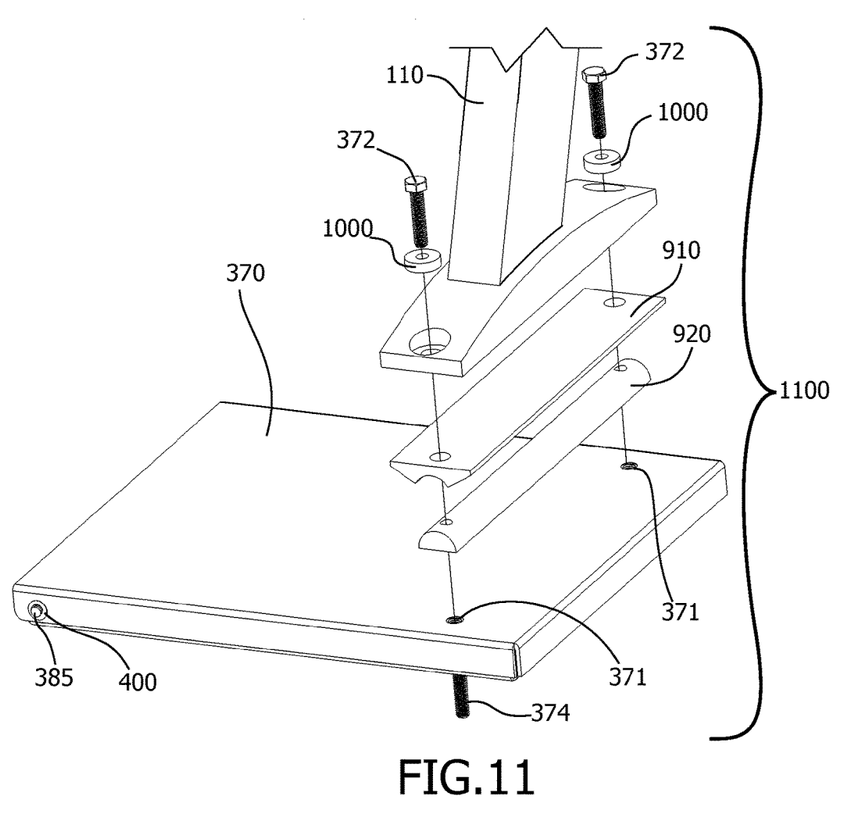
FIG. 11 is an exploded view of the embodiment shown in FIG. 10.

Turning now to FIGS. 9 through 11, an embodiment for configuration of dual axis theater seat assembly 900 is shown. FIG. 10 illustrates one side of the dual axis theater assembly 900 shown in FIG. 9, and FIG. 11 is an exploded view of FIG. 10. According to the present embodiment two transducer 122 assemblies are arranged such that the axes of hinges 385 are in line with front axis of theater seat 100 (generally the direction of sight that a person sitting in seat 100 would experience), and bolted to the floor using screws 374. Transducers 122 are functionally and systematically analogous to transducers 120 of the present invention, however transducers 122 are sized and configured to accommodate the dual axis theater seat assembly 900 as illustrated. Legs 110 of seat 100 are mounted to the edge opposite hinges 385 of each transducer 122 via an assembly 1100 comprising half round rod 920 in flush mounted with top plate 370 of transducer 122, and half round rod bushing 910 mounted to the bottom surface of seat leg 110. Screws 372 are mounted through spring washers 1000 and then coupled with nuts 371 in top plate 370. In this embodiment the half round rod 920 and half round rod bushing 910 are operative together during motion induced in transducer 122 to rotate freely as the top plate 370 moves and the angle of top plate 370 with respect to bottom plate 380 changes. The spring washer 1000 provides for secure mounting of the seat 100 to transducer 122 while allowing a slight angle change of seat 100 relative to top plate 370. The dual axis theater assembly 900 allows each foot of a dual foot seat 100 to be individually actuated to produce a side-to-side or tilt motion as well as an up and down motion. The degree of motion is limited by the clearances around the seat mounting bolts, the max displacement of the spring washer and the range of motion of the electromagnetic linear motor. In this embodiment the seat foot can be replaced with a platform to produce a surface for dual-axial motion and vibration. The rod and bushing elements in this current embodiment can be made of metal and plastic respectively, however it will be understood and appreciated that many different types and configurations of rod and bushing materials may be used for desired configurations in accordance with the current invention.

Figure 12:
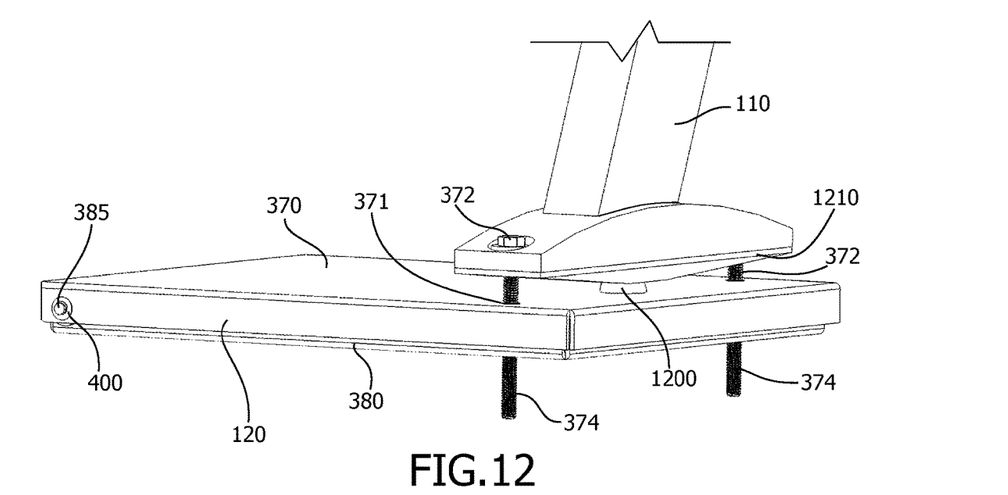
FIG. 12 is another embodiment of the theater seat attachment system in a three axis embodiment of the present invention.
Figure 13:
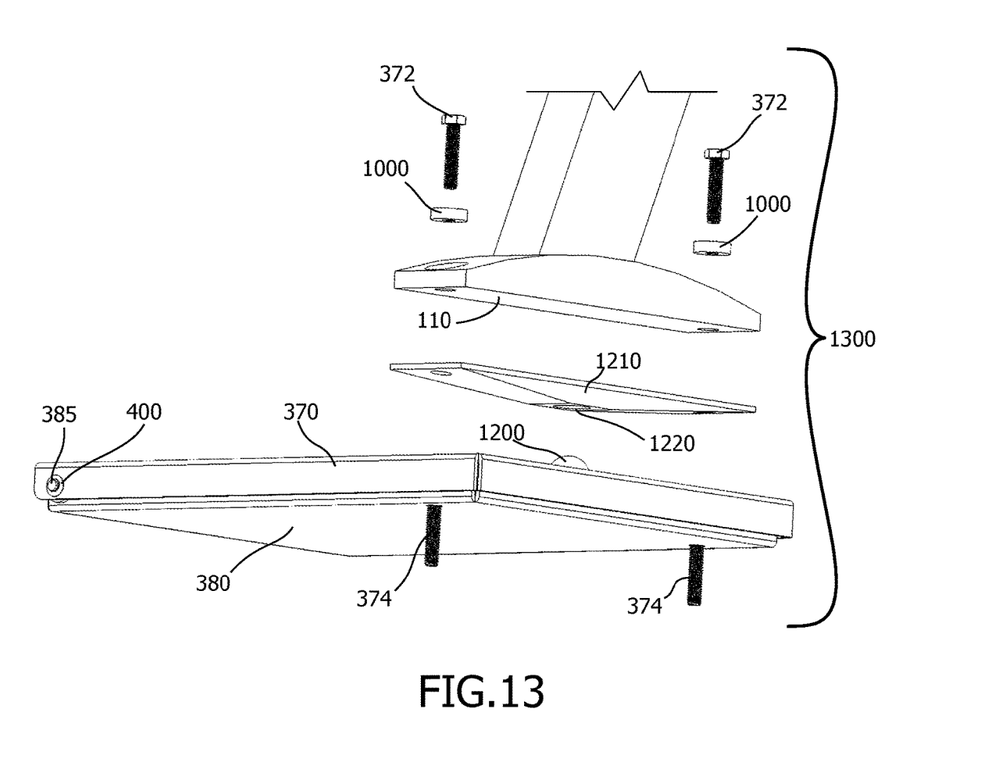
FIG. 13 is an exploded view of the embodiment showing in FIG. 12.

FIGS. 12 and 13 depict an alternate bushing configuration for mounting seat leg 110 to transducer 122. In this embodiment half sphere 1200 is mounted on top plate 370 opposite the side of hinge 385. Bushing 1210 having concave half sphere bushing seat 1220 is mounted to seat leg 110 such that rotational contact can be made with half sphere 1200. Screws 372 are mounted through spring washers 1000 and then coupled with nuts 371 in top plate 370. In this embodiment the half sphere 1200 and bushing 1210 are operative together during motion induced in transducer 122 to rotate freely as the top plate 370 moves and the angle of top plate 370 with respect to bottom plate 380 changes. The spring washer 1000 provides for securing mounting the seat 100 to transducer 122 while allowing a slight angle change of seat 100 relative to top plate 370. This configuration allows each foot of a seat with three or more feet to be individually actuated to produce three or more axis of motion. Rocking, tilting, as well as an up and down motion is possible with three hinged motion transducers. The degree of motion is limited by the clearances around the seat mounting bolts, the max angular displacement of the spring washer, and the range of motion of the electromagnetic linear actuator. In this embodiment the seat leg can be replaced with a platform to stand on, or for placement of machines, chairs, or other items of furniture to produce a surface for multi-axial motion and vibration.

Figure 14:
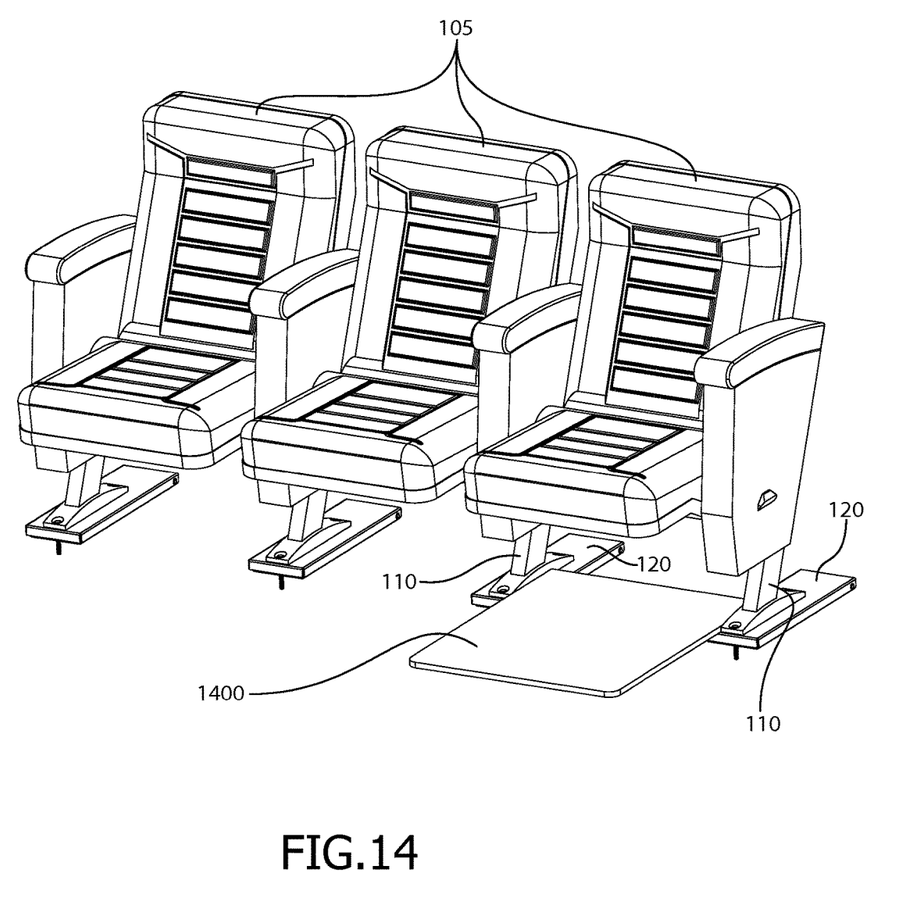
FIG. 14 is a view showing one embodiment of the current invention including a top moving plate extension.

FIG. 14 illustrates an alternate embodiment of the current invention implementing a plate structure to enhance motion sensation for a user. In this embodiment top moving plate 1400 is rigidly affixed to one or more transducers 120 under seat 105 as illustrated. Top moving plate may be any rigid surface substrate such as metal, wood, plastic etc. which is able to impart the induced motion in transducer 120 to the feet of a user in seat 105. It will be appreciated that the use of top moving plate 1400 produces a more realistic sensation in a user in seat 105 by allowing that users entire body, including feet, to experience motion sensations from transducer 120. In other words, a whole body experience can be accomplished via this embodiment as opposed to other embodiments where the users feet may be resting on the ground in front of seat 105 where motion sensations from transducer 120 will not be felt. For convenience in a multi seat setup, top moving plate 1400 may be configured with hinges (not shown) to fold or lift up when seat 105 folds up, or slidable elements such that top moving plate can slide to the back of seat 105 in order to allow access through isles or walkways surrounding seats 105. Top moving plate 1400 may also be shaped and configured (ie. with angles or bent portions) to be very low and close to floor 390 in order to avoid tripping hazards in a multi seat arrangement while still providing whole body motion sensation according to the current embodiment.

It will be appreciated that in addition to the various shapes, sizes, and configurations (collectively the transducer assembly), and bushing and spring assembly arrangements discussed in various embodiments above, many different ways of mounting or integrating the electromagnetic and spring assemblies with the armature top plate and stator bottom plate are possible in order to fashion a robust, low profile transducer assembly in keeping with the spirit and scope of the present invention. Additionally, while the overall transducer housing (as shown and described) comprises top and bottom plates having a substantially square shape, it will be understood that many different transducer housing shapes, sizes, and configurations are possible in keeping with the spirit and scope of the current invention. For instance, circular, triangular, rectangular, hexagonal, octagonal, as well as many other transducer housing (i.e. the top and bottom plates which form the armature and stator portions respectively) shapes and structures may be implemented in conjunction with the current invention.

Many additional forms and implementations of the low profile transducer apparatus of the present invention could be contemplated for a variety of purposes without departing from the scope and spirit of the current invention.

The system and process of the present invention has been described above in terms of functional aspects in schematic diagram format. It is understood that unless otherwise stated to the contrary herein, one or more functions and aspects of the apparatus may be integrated in a single physical device, or one or more functions may be implemented in separate physical devices, without departing from the scope and spirit of the present invention.

It is appreciated that detailed discussion of the actual implementation of each apparatus module is not necessary for an enabling understanding of the invention. The actual implementation is well within the routine skill of a mechanical and system engineer, given the disclosure herein of the system attributes, functionality, and inter-relationship of the various functional modules in the system. A person skilled in the art, applying ordinary skill can practice the present invention without undue experimentation.

While the invention has been described with respect to the described embodiments in accordance therewith, it will be apparent to those skilled in the art that various modifications and improvements may be made without departing from the scope and spirit of the invention. Accordingly, it is to be understood that the invention is not to be limited by the specific illustrated embodiments.

What is claimed is:

1. A moveable assembly for imparting motion to a moveable object in conjunction with analog electrical signals from an external source, comprising:
    a first electromagnetic motion-generating assembly positioned between a base surface and the bottom of the moveable object;
    a second electromagnetic motion-generating assembly located adjacent to the first electromagnetic motion-generating assembly, and positioned between the base surface and the bottom of the moveable object;
    wherein:
    the first electromagnetic motion-generating assembly and the second electromagnetic motion generating assembly are both hinged electromagnetic motion-generating assemblies, the first electromagnetic motion-generating assembly capable of producing motion in the moveable object in response to the analog signals in a first axis, and the second electromagnetic motion-generating assembly capable of producing motion in the moveable object in response to the analog signals also in the first axis.

2. A moveable assembly as in claim 1, wherein each of the first and second electromagnetic assemblies comprise:
    a rigid hinged enclosure for providing resilient support to the moveable object;
    a voice coil portion within the rigid hinged enclosure;
    a permanent magnet within the rigid hinged enclosure for interacting with the voice coil portion;
    a metallic pole piece within the rigid hinged enclosure for interacting with the magnetic field of the permanent magnet;
    a spring element within the rigid hinged enclosure for providing resilient support within the hinged enclosure;
    wherein the voice coil, permanent magnet, metallic pole piece, and spring element are operable together in the presence of the analog electrical signals from an external source to generate variable motion with respect to top and bottom portions of the rigid hinged enclosure.

3. A moveable assembly as in claim 2, wherein the hinged portion of the first electromagnetic motion-generating assembly is situated in a substantially parallel orientation to the hinged portion of the second electromagnetic motion-generating assembly.

4. A moveable assembly as in claim 2, wherein the hinged portion of the first electromagnetic motion-generating assembly is situated in a substantially perpendicular orientation to the hinged portion of the second electromagnetic motion-generating assembly, and wherein the second electromagnetic motion-generating assembly is capable of producing motion in the moveable object in response to the analog signals in a second axis.

5. A moveable assembly as in claim 1, wherein the moveable object comprises an object from the group consisting of:
   a platform;
   a chair.

6. A moveable assembly as in claim 1, wherein the analog electrical signals from an external source comprise signals from the group consisting of:
   signals from an audio visual presentation system;
   signals from a motion control system.

7. A moveable assembly as in claim 4, wherein the first axis of motion produced consists of rocking motion with respect to the moveable object, and the second axis of motion produced consists of tilting motion with respect to the moveable object.

8. A moveable assembly as in claim 7, wherein a third electromagnetic motion-generating assembly is located adjacent to the first electromagnetic motion-generating assembly and second electromagnetic motion-generating assembly, such third electromagnetic motion-generating assembly being positioned between the base surface and the bottom of the moveable object;
   wherein the third electromagnetic motion-generating assembly is capable of working in connection with the first electromagnetic motion-generating assembly and second electromagnetic motion-generating assembly to produce motion in the moveable object in response to the analog signals in a third axis.

9. A moveable assembly as in claim 2, wherein each of the each of the first and second electromagnetic assemblies include an electrical amplifier within the rigid hinged enclosure for receiving and amplifying the analog electrical signals.

10. A motion-enhanced seating system comprising:
    a first electromagnetic motion-generating assembly positioned between a base surface and a first support leg of the seating system;
    a second electromagnetic motion-generating assembly located adjacent to the first electromagnetic motion-generating assembly, and positioned between the base surface and a second support leg of the seating system;
    wherein:
      the first electromagnetic motion-generating assembly and the second electromagnetic motion generating assembly are both hinged electromagnetic motion-generating assemblies, the first electromagnetic motion-generating assembly capable of producing motion in the seating system in response to first analog electrical signals in a first axis, and the second electromagnetic motion-generating assembly capable of producing motion in the seating system in response to second analog electrical signals also in the first axis.

11. A motion-enhanced seating system as in claim 10, wherein each of the first and second electromagnetic motion-generating assemblies comprise:
    a rigid hinged enclosure for providing resilient support to the seating system;
    a voice coil portion within the rigid hinged enclosure;
    a permanent magnet within the rigid hinged enclosure for interacting with the voice coil portion;
    a metallic pole piece within the rigid hinged enclosure for interacting with the magnetic field of the permanent magnet;
    a spring element within the rigid hinged enclosure for providing resilient support within the hinged enclosure;
    wherein the voice coil, permanent magnet, metallic pole piece, and spring element are operable together in the presence of the first analog electrical signals and second analog electrical signals to generate variable motion with respect to top and bottom portions of the rigid hinged enclosure.

12. A motion-enhanced seating system as in claim 11, wherein the hinged portion of the first electromagnetic motion-generating assembly is situated in a substantially parallel orientation to the hinged portion of the second electromagnetic motion-generating assembly.

13. A motion-enhanced seating system as in claim 11, wherein the hinged portion of the first electromagnetic motion-generating assembly is situated in a substantially perpendicular orientation to the hinged portion of the second electromagnetic motion-generating assembly, and wherein the second electromagnetic motion-generating assembly is capable of producing motion in the seating system in response to the analog signals in a second axis.

14. A motion-enhanced seating system as in claim 10, wherein the second support leg of the motion-enhanced seating system is a shared support leg between two seats of the seating system.

15. A motion-enhanced seating system as in claim 10, wherein the first and second analog electrical signals from an external source comprise signals from the group consisting of:
    signals from an audio visual presentation system;
    signals from a motion control system.

16. A motion-enhanced seating system as in claim 10, wherein the first axis of motion produced consists of rocking motion with respect to the seating system, and the second axis of motion produced consists of tilting motion with respect to the seating system.

17. A motion-enhanced seating system as in claim 16, wherein a third electromagnetic motion-generating assembly is located adjacent to the first electromagnetic motion-generating assembly and second electromagnetic motion-generating assembly, such third electromagnetic motion-generating assembly being positioned between the base surface and at least one of the first and second support leg of the seating system;
    wherein the third electromagnetic motion-generating assembly is capable of working in connection with the first electromagnetic motion-generating assembly and second electromagnetic motion-generating assembly to produce motion in the seating system in response to the analog signals in a third axis.

18. A motion-enhanced seating system as in claim 17, wherein the third axis of motion produced consists of a linear up-down motion with respect to the seating system.

19. A motion-enhanced seating system as in claim 11, wherein each of the each of the first and second electromagnetic assemblies include an electrical amplifier within the rigid hinged enclosure for receiving and amplifying the analog electrical signals.

20. A motion-enhanced seating system as in claim 11, wherein a slidable support platform is positioned between the first and second support leg of the seating system such that during operation of the motion enhanced seating system a user seated in the seating system is able to move the support platform into a position in order to rest the users feet on the support platform, and during non-operation of the motion enhanced seating system the slidable support platform is able to be slidably moved beneath the seating system for storage.

* * * * *